United States Patent
Bacon et al.

(10) Patent No.: US 10,915,231 B1
(45) Date of Patent: Feb. 9, 2021

(54) SEAT SELECTION APPLICATION FOR SOCIAL DISTANCING COMPLIANCE

(71) Applicants: Kirk David Bacon, Westminster, CA (US); Esther Jusiri Jeong, Westminster, CA (US)

(72) Inventors: Kirk David Bacon, Westminster, CA (US); Esther Jusiri Jeong, Westminster, CA (US)

(*) Notice: Subject to any disclaimer, the term of this patent is extended or adjusted under 35 U.S.C. 154(b) by 10 days.

(21) Appl. No.: 16/871,033

(22) Filed: May 10, 2020

Related U.S. Application Data

(63) Continuation of application No. 16/840,456, filed on Apr. 6, 2020.

(51) Int. Cl.
| | |
|---|---|
| *G06F 3/0484* | (2013.01) |
| *G06F 3/0482* | (2013.01) |
| *G06F 9/451* | (2018.01) |
| *G06Q 20/12* | (2012.01) |
| *G06Q 30/00* | (2012.01) |
| *G06Q 10/02* | (2012.01) |

(52) U.S. Cl.
CPC .......... *G06F 3/0484* (2013.01); *G06F 3/0482* (2013.01); *G06F 9/451* (2018.02); *G06Q 10/02* (2013.01); *G06Q 20/12* (2013.01); *G06Q 30/018* (2013.01)

(58) Field of Classification Search
CPC .................................................. G06F 3/0484
USPC ......................................................... 715/733
See application file for complete search history.

(56) References Cited

U.S. PATENT DOCUMENTS

| | | | |
|---|---|---|---|
| 8,024,234 B1* | 9/2011 | Thomas | G06Q 10/02 705/26.61 |
| 10,366,373 B1* | 7/2019 | Denker | G06Q 10/0635 |
| 2008/0082355 A1* | 4/2008 | Leach | G06Q 40/04 705/310 |
| 2008/0103801 A1* | 5/2008 | Leach | G06Q 40/04 705/310 |
| 2008/0255889 A1* | 10/2008 | Geisler | G06Q 10/02 705/5 |
| 2009/0063206 A1* | 3/2009 | Payne | G06Q 30/0601 705/5 |
| 2009/0277451 A1* | 11/2009 | Weinberg | A41D 13/1176 128/206.14 |
| 2010/0082374 A1* | 4/2010 | Charania | G06Q 30/0601 705/5 |

(Continued)

OTHER PUBLICATIONS

Reddit.com, "Event Cinemas have updated their seating maps to comply with social distancing and 100-person limits to prevent coronadling between couples." available online at [https://www.reddit.com/r/sydney/comments/fl1q3w/event_cinemas_have_updated_their_seating_maps_to/], published on Mar. 18, 2020 (Year: 2020).*

*Primary Examiner* — Reza Nabi

(57) ABSTRACT

In various examples, a seating application may be leveraged to allow users to select—within a graphical user interface (GUI)—a seat or seats at a venue that maintain compliance with social distancing standards. For example, as each user selects seats, the seats available to the next users may be updated—e.g., dynamically—such that a minimum distance is maintained between and among each individual user or group of users (e.g., a family). As a result, during periods where social distancing measures may be in place, users and venue staff may have peace of mind that social distancing standards are being met to ensure safety, while also maximizing event space usage.

20 Claims, 5 Drawing Sheets

(56) References Cited

U.S. PATENT DOCUMENTS

| | | | |
|---|---|---|---|
| 2010/0150941 A1* | 6/2010 | Hanson | C07K 16/1018 424/159.1 |
| 2011/0282700 A1* | 11/2011 | Cockcroft | G06Q 30/06 705/5 |
| 2012/0166960 A1* | 6/2012 | Salles | G06Q 10/087 715/738 |
| 2012/0221362 A1* | 8/2012 | Nezer | G06Q 30/06 705/5 |
| 2013/0124234 A1* | 5/2013 | Nilsson | G06Q 30/06 705/5 |
| 2013/0159031 A1* | 6/2013 | Sunshine | G06Q 30/02 705/5 |
| 2013/0339069 A1* | 12/2013 | Hampel | G07B 5/00 705/5 |
| 2014/0032250 A1* | 1/2014 | Oxenham | G01C 21/206 705/5 |
| 2014/0095223 A1* | 4/2014 | Oxenham | G06Q 10/02 705/5 |
| 2014/0188527 A1* | 7/2014 | Oxenham | G08B 5/221 705/5 |
| 2014/0188528 A1* | 7/2014 | Oxenham | G06Q 10/02 705/5 |
| 2015/0106134 A1* | 4/2015 | Gandham | G06Q 10/02 705/5 |
| 2015/0227969 A1* | 8/2015 | Hanly | G06Q 30/0252 705/14.5 |
| 2016/0104347 A1* | 4/2016 | Yang | G07F 17/3218 463/25 |
| 2016/0117329 A1* | 4/2016 | Busey | G06F 16/287 707/726 |
| 2016/0132652 A1* | 5/2016 | Chapman Bates | G06F 19/00 706/11 |
| 2018/0060895 A1* | 3/2018 | Sunshine | G06Q 10/02 |
| 2018/0161458 A1* | 6/2018 | Trager | A61K 9/282 |
| 2020/0167699 A1* | 5/2020 | Cohen | H04L 51/32 |

* cited by examiner

SEAT SELECTION APPLICATION FOR SOCIAL DISTANCING COMPLIANCE

CROSS-REFERENCE TO RELATED APPLICATIONS

This application is a continuation of U.S. Non-Provisional application Ser. No. 16/840,456, filed on Apr. 6, 2020, which is hereby incorporated by reference in its entirety.

BACKGROUND

Seating applications and associated graphical user interfaces (GUIs) allow users to select seats for any of a variety of events or activities—such as movies, sporting events, concerts, musicals, plays, eating out, etc. However, during times where social distancing measures may be in place—such as during a quarantine due to a pandemic, air quality issues, and/or the like—these applications fail to account for such measures. For example, a user may select and purchase seats in advance only to be turned away when arriving at the locations of the event or activity due to policies, practices, or measures that are in effect. As such, a user may waste their time selecting and purchasing the tickets, driving to and from the location, and ultimately attempting to be refunded. With respect to the establishment or location of the event or activity, attempts to comply with social distancing measures may fall short. For example, employees or other workers may attempt to space individuals or parties (e.g., families) at a certain distance from other individuals or parties using their own perception. However, these attempts, although done with good intent, may prove futile as the spacing of individuals or parties may not actually comply with social distancing standards (e.g., at least six feet of distance between people from separate parties) and/or may not maximize the capacity of the space (e.g., may actually seat less people than acceptable under the current measures). As a result, there is a need for an application with a GUI that supports social distancing measures—thereby not only improving the user experience, but also allowing a venue to maximize seating while also complying with social distancing and/or other quarantine standards.

SUMMARY

Embodiments of the present disclosure relate to a seating selection application for social distancing compliance. Systems and methods are disclosed that dynamically adjust available seating at a venue, in a restaurant, on an airplane, at an amusement park, or in another space based on user selections. As a result, when a user attempts to select seats, the seats available to the user—and presented as such within a graphical user interface (GUI)—may be in compliance with social distancing and/or other quarantine standards thereby improving the user experience. In addition, because the application may have knowledge of actual spacing between and dimensions of each seat or occupied space at each respective venue or activity location, the assigned seats of each of the users may be compliant with social distancing measures. Further, the event or activity location—e.g., venue, restaurant, airplane, stadium, etc.—may leverage the application to assign seats such that the seating capacity is maximized while still keeping the location in compliance with any local, state, or federal mandatory or suggested social distancing guidelines. Thus, in contrast to conventional systems, such as those described above, the present social distance seating or occupancy application may reduce user frustration, provide peace of mind to users and venue staff, as well as maximize profits and compliance for the venue even during times where stringent social distancing measures may be in place.

BRIEF DESCRIPTION OF THE DRAWINGS

The present systems and methods for a seating application for social distancing compliance are described in detail below with reference to the attached drawing figures, wherein.

DETAILED DESCRIPTION

Systems and methods are disclosed related to a seating application for social distancing compliance. The social distancing or minimum distance measures described herein correspond to any location, venue, activity, or object, such as but not limited to: airplanes, trains, buses, subways, metro, amusement parks, parks, concert halls, musical theaters, concert venues, movie theaters, restaurants, bars, wedding venues, event venues, fitness centers, or gyms. In addition, although seats is the primary space described herein, this is not intended to be limiting. In some embodiments, any type of space for a person may be used, such as a seat, a portion of an environment (e.g., a three foot by three foot square in the environment), a portion of a bench or table, a portion of a standing room only section of a venue, restaurant, or bar, etc. In addition, although primarily described herein with respect to minimum distance measures, methods and systems described herein may generally be used for managing capacities, updating capacity information, space reservations, and/or the like, whether or not minimum distance measures are in place. Although primarily described herein with respect to social distancing compliance, the present seating application may be used in any circumstance where social distancing is desired or required. For example, where a venue is reserved for multiple separate parties, the seating application may allow each party to select a location (e.g., including some number of seats, a space within the venue, etc.), and the available locations for a next party may be based on the already selected locations of other parties such that social distancing rules are satisfied. In such an example, the social distancing rules may be based on a level of sound (e.g., in decibels) that may carry in the event space. As such, assuming the distance between parties is ten feet based on an analysis of the sound information, the locations available to a party may be such that a ten foot distance between and among all parties is satisfied. As another example, where a game is to be played with various groups or individuals, and a distance between groups is required or suggested for the game, the seating application may be used to allow individuals or teams to select locations at the venue that comply with the distance standards.

Figure 1:
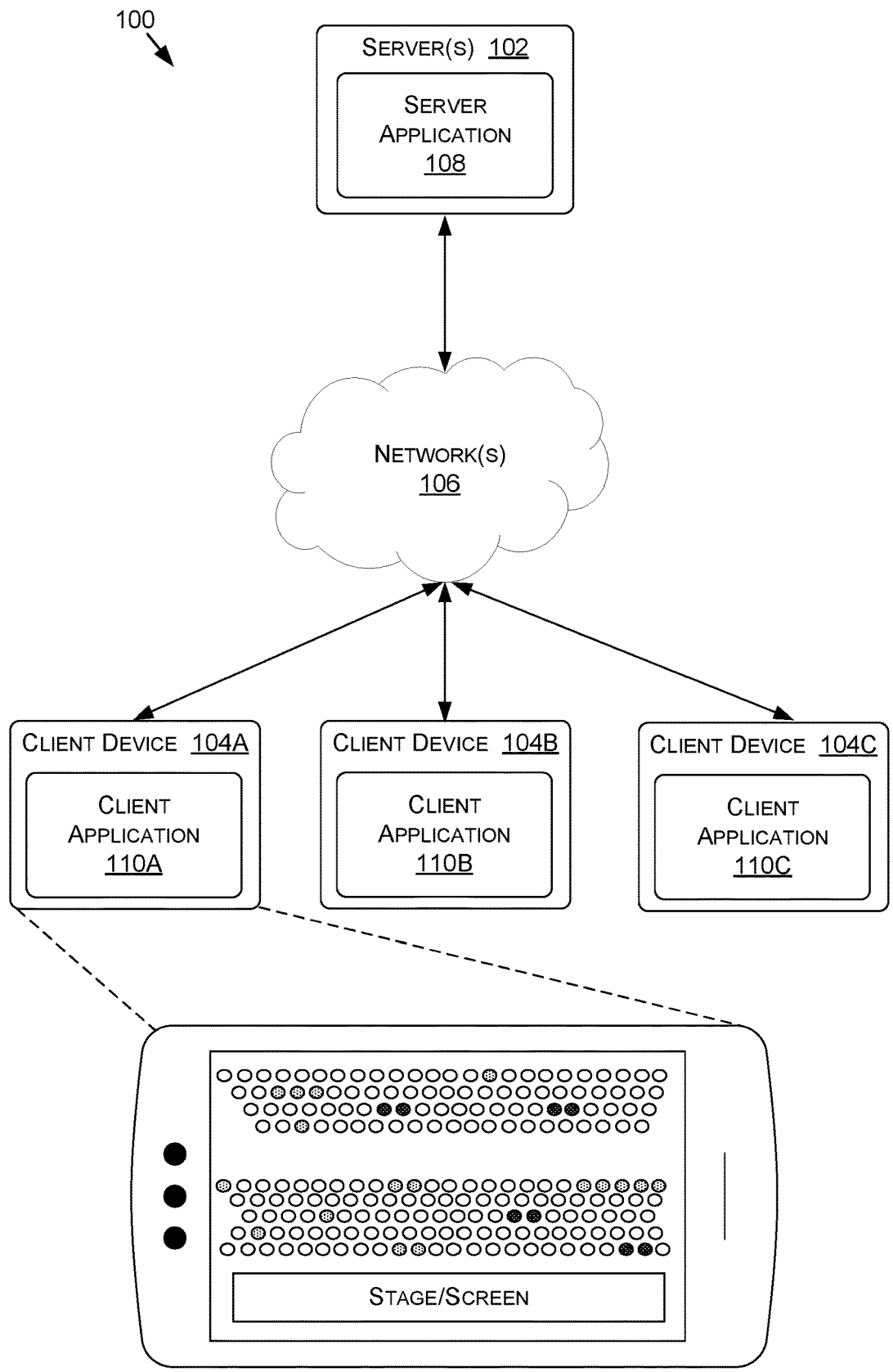
FIG. 1 is a block diagram of a seating application system, in accordance with some embodiments of the present disclosure.

With reference to FIG. 1, FIG. 1 is an example seating application system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In addition, in some embodiments, features, functionalities, and/or components of the system 100—such as the server(s) 102 and/or the client device(s) 102—may be similar to those described herein with respect to example computing device 400 of FIG. 4. In other embodiments, additional and/or alternative features, functionalities, and/or components of the system 100 other than those described herein with respect to example computing device 400 of FIG. 4 may be implemented without departing from the scope of the present disclosure.

The system 100 may include one or more servers 102 (or other remote computing devices) communicatively coupled to one or more client devices 104 (e.g., client devices 104A-104C) over one or more networks 106 (e.g., local area networks (LANs), wide area networks (WANs), etc.). For example, the server(s) 192 and the client device(s) 104 may be nodes in a cloud computing or distributed computing environment. The client device(s) 104 may include a smartphone, a tablet computer, a laptop computer, a desktop computer, a smart television, a streaming device (e.g., an APPLE TV, an AMAZON FIRE STICK, etc.), a smart watch, a game console, an electronic kiosk (e.g., for purchasing tickets at a movie theater or other venue), and/or another type of client device.

The server(s) 102 may include a server application 108 for managing reserved, unavailable, and/or available seats for users of the client devices 104 in compliance with social distancing or other required or desired distance measures. For example, the server application 108 may update seating diagrams corresponding to any of variety of venues, forums, objects (e.g., multi-passenger vehicles), and/or the like. As such, as users of client applications 110 on the client devices 104 select seats, request available seats, etc. within the client application 110, the server application 108 may update or populate the seating diagrams and transmit the same to the client applications 110 in real-time or near real-time.

In some embodiments, the client applications 110 may correspond to different vendors, companies, or software developers, and the server application 108 may act as a central host for each different client application 110. As such, a first user may use a third party vendor client application 110 (e.g., FANDANGO) to purchase a ticket for a movie and a second user may use a client application 110 corresponding to the specific theater company (e.g., CINEMARK, AMC, etc.). In either case, the seating diagrams populated within each client application 110 may be accurate and updated based on the server application 108. In such examples, the server application 108 may communicate with one or more servers 102—and corresponding applications—of the third party vendor and/or the specific theater. For example, the server application 108 may include an application programming interface (API) that may be accessed by third party applications and/or the client applications 110 in order to generate up-to-date and accurate seating diagrams, as well as proposed available seats within the seating diagrams, that comply with social distancing or other minimum distance measures.

The client applications 110 may include one or more graphical user interfaces (GUIs) for performing various operations with respect to the client application 110. For example, a user may create an account for himself or herself, add names and/or information about other members of a party, provide location information, enable certain features of the client device 104 for the client application 110 (e.g., notifications, location tracking or access, microphone access, camera access, speaker access, etc.), link payment information, select favorites, interests, or preferences, add member numbers (e.g., frequent flyer numbers, rewards numbers, etc.), and/or other account information.

In addition, a user may select an activity, an event, a venue, a flight, a bus route, a train route, a restaurant, etc. within the client application 110. In some embodiments, the user may provide a number of persons in their party and/or a number of seats or spaces (e.g., actual seats, standing locations, demarcated seats on a bench, spots in a line, machines at a casino, etc.) desired—e.g., using graphical elements 206A and 206B within GUI 202A of FIG. 2A. The user may require verification prior to being allowed to select seats, or to select seats for others in a party. The verification may correspond to whether the user is a certain age (e.g., for a rated R movie, to travel alone or with others who are not above a certain age, etc.), whether the members of a party all satisfy some criteria (e.g., where there is a pandemic or other issue, may require that parties be members of an immediate family such that the event space is not used for gatherings of friends or other parties who are not immediately quarantined together), whether payment information is verified, etc. In some embodiments, this verification may be via documentation provided by the user as part of account information or transaction information. For example, the documentation may include birth certificate, driver's license, passport, names from various documents, addresses from various documents, a combination thereof, etc. In other embodiments, the verification may correspond to a testing outcome. For example, where social distancing measures are in place due to a pandemic, the verification may include uploading, providing documentation of, or linking to results of a negative test (or a test indicating that the party member is no longer contagious) within some window of time (e.g., 24 hours, a week, a month, etc.). For example, an indication of the verification or absence thereof may be provided via display element 204 of FIG. 2A.

Figure 2A:
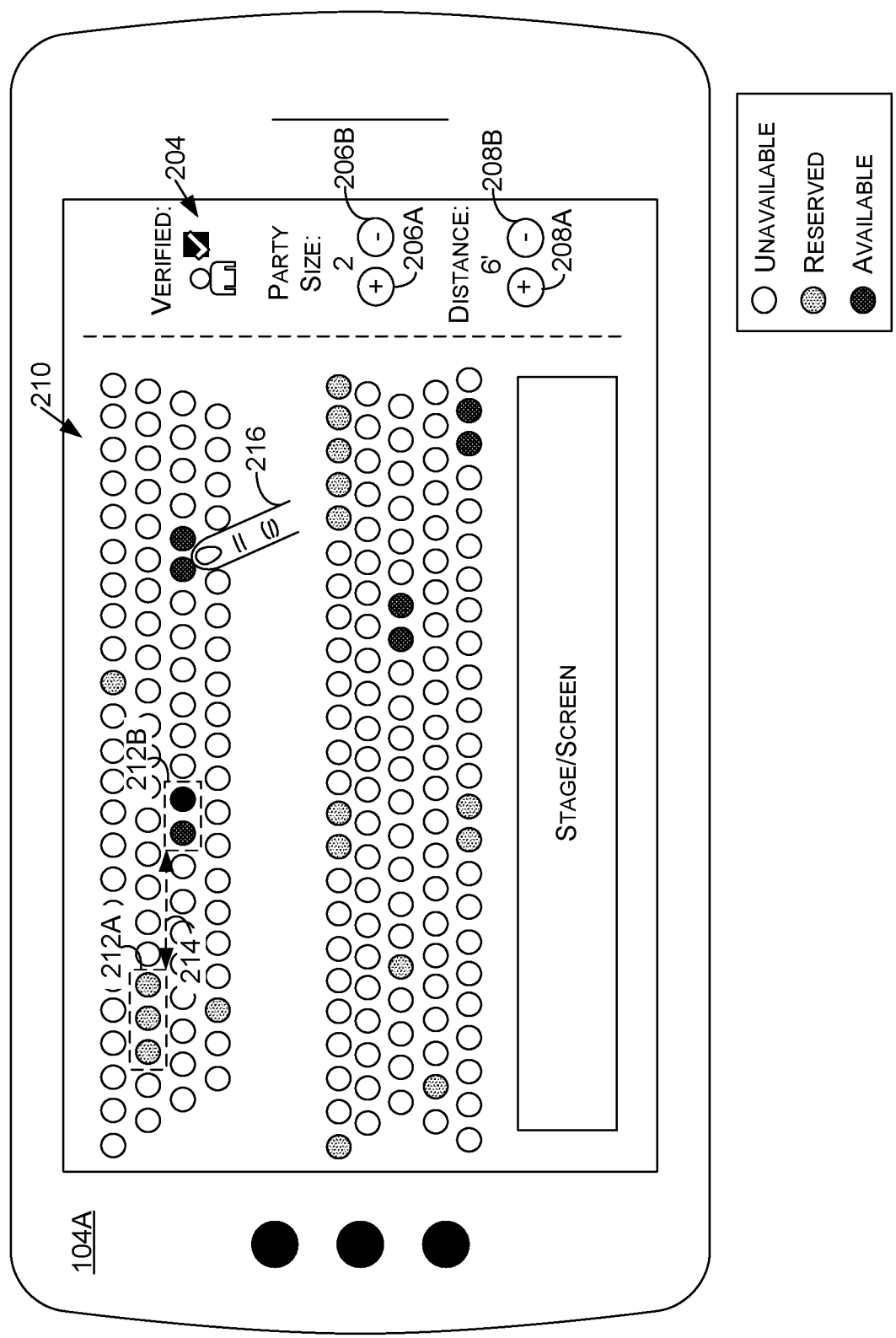
FIGS. 2A-2B depict example illustrations of a graphical user interface (GUI) for selecting seats at a location, in accordance with some embodiments of the present disclosure.

In some embodiments, a user may be able to select a minimum distance measure—e.g., using graphical elements 208A and 208B of FIG. 2A. For example, where social distancing requirements are not in place, there may be situations, events, activities, etc. (e.g., individuals who prefer distance, to protect privacy of conversations, etc.) where a minimum distance measure is desired or required. As such, in some embodiments, a user may select a minimum distance measure. The user may desire to sit a certain distance from others, especially where a location is not fully busy (e.g., full, at capacity, etc.). Available seats may thus be determined based on the minimum distance measure selected by the user. In other examples, even where a social distancing required minimum distance is in place, the graphical elements 208A and 208B may be used to adjust the minimum distance upwards such as to provide a greater barrier of protection. In some embodiments, a user may also select to have their seating dynamically adjusted—even after purchase—to comply with a user-defined minimum distance measure. As such, where a user first selects a seat(s) that is at least ten feet from a nearest reserved seat, then another user selects a seat that now makes the nearest reserved seat six feet, the seats of the original user may be reassigned—if possible—to satisfy the ten foot distance measure or at least to increase the distance measure as much as possible up to ten feet.

In some embodiments, although not illustrated, a capacity of location or venue may be displayed within the GUI, where the capacity may differ based on predefined (e.g., social distancing requirements) and/or user-defined distance measures. In further embodiments, a current capacity may be displayed in the GUI, and/or a current capacity in view of the allowed capacity which may provide an indication of how busy the location is. The current capacity may be illustrated as a number of persons, as a percentage of the actual capacity, and/or in another format. In some embodiments, the GUI may display the suggested or required minimum distance measure. For example, where the GUI does not allow for changing the distance measure, the GUI may still display the current minimum distance measure for that location. In some embodiments, minimum distance measures may be different depending on the type of venue—e.g., outdoor distance measures may be greater than indoor distance measures. In addition, in some embodiments, a number of available spaces may be populated within the GUI, such that a user would be able to see how many spaces are available in total. As such, where the GUI only displays a portion of the seating or spaces available (e.g., because an entire venue may not fit on a screen, such as a sports venue), the user may still be able to view the total number available spaces at the venue and/or the total number of available spaces in the currently displayed portion of the venue.

In some embodiments, lines for rides at amusement parks, stores, bathrooms, concession stands, etc. may be monitored using one or more sensors (e.g., pressure, weight, heat, etc.), one or more cameras, and/or sensors of a user's client devices 104 (e.g., location sensors, network connections such as Bluetooth, Wi-Fi, near field communication, etc.). For example, the lines may be monitored in view of social distancing measures and/or other minimum distance measures. In such examples, the sensor data and/or image data may be analyzed to monitor that people are obeying the minimum distance measures, and when they are not, a signal may be generated (e.g., a voice prompt, an audio prompt, a message to an employee, a notification on the person's phone that is not obeying the rules, etc.). In addition, the number of persons in the line may be monitored, such as to update the system 100 as to how many people are in line as compared to a maximum allowed amount in the line. This information may also be used to update the GUI such that a user can see if there are any spots left in a line, if there are no spots left, how many spots are taken, how many spots are allowed in total, etc.

Once a user has entered their party size or the number seats of desired, the distance has been set (e.g., user-defined, predefined based on social distancing, etc.), the venue, location, activity, event, and/or object has been selected, the user (and/or their party) has been verified, and/or the account information has been updated, this information may be used—e.g., by the client device(s) 104 and/or the server device(s) 102—to update or populate a seating diagram 210 corresponding to the venue, location, activity, event, and/or object. In the illustration of FIG. 2A, the event may be a particular movie at a particular time within a particular movie theater. As such, the seating diagram 210 may be updated or populated to include available seats, unavailable seats (e.g., due to minimum distance measures), reserved seats (which may also be unavailable), and/or other seat types (e.g., handicap). Just as each previously reserved seat from any other user may have been determined based on the minimum distance measure, the locations of available seats (e.g., sets of seats, which may only include one seat, in examples) may be determined by the system 100—e.g., by the client device(s) 104 and/or the server device(s) 102—in view of the minimum distance measure (e.g., pre-defined, user-defined, etc.).

To make the determination of which seats are available in compliance with the minimum distance measure, various methods may be used. For example, in some embodiments, an estimated or known size and/or dimension of seats (e.g., all airline seats for a particular aircraft and/or airline company may be the same size and/or spacing, similarly for movie theaters or other venues, etc.), distances (e.g., average distance) between seats, orientation of seats, etc. may be used to determine available seats that comply with the minimum distance measure. As such, in some embodiments, seat models or product numbers may be provided by venues, companies, and/or the like and this information may be used to generate an understanding by the system 100 of the dimensions and relative distances between various seats or other occupancy locations (e.g., standing room areas). In other examples, an actual size and/or dimension of seats, spacing between and among seats, and/or other spacing and orientation information of the event space may be determined. For example, measurements may be taken by the venue or hosting company, by an employee of a company associated with the system 100, by a third party, etc. In some embodiments, this actual measure may be taken using images (e.g., from cameras at the location, from cameras brought in to take the images, etc.), building diagrams or construction documents (e.g., filed with a city or town), and/or other resources. In such examples, such as where images are used, accurate dimensions may be determined using an object of a known size to calibrate the cameras or the system 100 such that the dimensions of the seats, the space, etc. may be computed accurately.

In some embodiments, such as where each seat is not purchased or reserved electronically, various sensors, cameras, and/or other information may be used to determine which seats are occupied such that the recommended seats are based on minimum distance measures. For example, pressure sensors, heat sensors, and/or other sensor types associated with each seat may be leveraged to determine occupancy with respect to the seat. In some examples, cameras at the location may be leveraged using computer vision algorithms and/or machine learning models (e.g., deep neural networks, such as convolutional neural networks, trained to output a confidence with respect to an occupancy of each seat) to determine occupancy of respective seats. This information may thus be used by the system 100 to update the seating diagram. In embodiments where a venue is a restaurant, for example, that may not allow for reserved seats, the system 100 may be used to provide information as to whether seats are available that comply with the minimum distance measure. This information may then be used by a user to determine whether the user should visit the establishment and/or where in the establishment the user should sit in order to comply. In addition, this information may be leveraged to determine which locations are busy, not busy, and/or the like. In some embodiments, a user may be able to reserve a seat at a location for a period of time—e.g., 5 minutes, 10 minutes, etc. The reservations may also be based on other criteria, such as a distance of the user to the location—e.g., must be within a quarter mile to reserve a space. In this way, users may be able to reserve spaces at locations and/or monitor an occupancy status of a location from their client device 104, and thus may only enter locations where there is availability and/or where minimum distance measures are able to be maintained. This may not only provide peace of mind for the user, but also for the location, as well as providing a platform for more patrons and customers to visit locations knowing that they can do so while complying with desired and/or required minimum distance measures. Where assigned seating is not available at a location, or portions of a location do not have assigned seating (e.g., standing room only), this information may also be monitored (e.g., using cameras and/or other sensors) to determine a head count, a distance between individuals (e.g., are the standing room only areas also minimum distance measure compliant), and/or the like. In some embodiments, the client application 110 may also allow a user to place an order prior to arrival and/or during the stay. As such, when a user reserves a seat, they may also place an order of food, drinks, items, etc. In addition, while seated, they may be able to make orders from their client device 104 in order to expedite service—which may be even more critical where mandatory social distancing measures in place to limit a length of potential exposure. In such examples, the account preferences, interests, etc. may be stored, such that recommendations for the user based on their account information and the particular offerings of a locations may be provided to the user. In addition, a user may have "regular" or "recurring" orders, and the user may be prompted to enter these orders during the reservation time, at arrival (e.g., as determined from location sensors such as GPS, near field communication, connection to Wi-Fi of the location, a prompt, and/or otherwise), and/or at another time.

Once the measurements of the location have been determined, such as but not limited to as described herein, the seating diagram may be updated or populated to reflect the computation of the available seats. In some embodiments, points in space may be assigned to each point on each seat, may be assigned to each point along edges of a seat, may be assigned to some number of points along an outline of each seat, may be assigned to each point along a bounding shape (e.g., a box, square, rectangle, polygon, circle, triangle, etc.) corresponding to a seat, may be assigned to vertices or various points along a bounding shape, may be assigned to a bounding shape that encompasses each seat for each party, and/or may otherwise be assigned. For example, and with respect to FIG. 2A, a bounding box 212A may be associated with each of the reserved seats therein and a bounding box 212B may be associated with the two available seats therein (e.g., prior to determining they are available). A distance(s) 214 may be computed between the bounding box 212A and the bounding box 212B to determine whether the seats within the bounding box are available. This computation may be performed for each pair of seats not already determined to be unavailable and/or reserved, until the final outputs of the available seats are determined.

As such, the distance between points from one or more seats of each party may be compared to un-reserved seats—e.g., points corresponding thereto—in order to determine whether the minimum distance measure is satisfied for a number of seats corresponding to the number of persons in the party. The comparison may require that every single point associated with the reserved seats does not overlap with any point of the potential or un-reserved seats. In other embodiments, the comparison may require that only a single point doesn't overlap, that at least half of the points don't overlap, that at least two thirds of the points don't overlap, etc. Once the computation is performed with respect to the currently reserved seats (which may be indicated as such within the seating diagram 210 of the GUI) and the un-reserved seats, the seats that are unavailable—e.g., no matter what, due to the minimum distance measure—may be indicated as such within the seating diagram 210 in the GUI, the seats that are unavailable due to there not being a number of adjacent seats corresponding to the number of persons that each satisfy the minimum distance standard may be indicated as such within the seating diagram 210 of the GUI, and the remaining seats may be indicated as available.

In some embodiments, the seats that are indicated as available may also be based on additional computations, such as maximizing occupancy of the space. For example, if two seats that satisfy the minimum distance measure would render some number or percentage of other un-reserved seats unavailable, those two seats may not be listed as available to the user. As another example, sets of two seats that satisfy the minimum distance measure may be determined, then a computation of how many other seats become unavailable for each set if selected may be determined, and some number of the sets may be filtered out from availability based on this computation—e.g., only the two sets that correspond to a lowest number of seats rendered unavailable, sets within a top twenty five percent of the all sets that correspond to a lowest number of seats rendered unavailable, etc. In addition, in some embodiments, the reserved seats of any individuals may be dynamically updated to maximize capacity. As such, for new users or parties that are reserving seats, other seats may be reassigned to accommodate more users. For example, a party of two may be shifted to another location to allow their two seats to be used by a party of five, if the shift renders less seats unavailable as a result. Users may be notified of the dynamic shifting of seats, may opt-in, and/or may opt-out, depending on the embodiment. As such, some, none, or all users may be subject to dynamic shifting of seats.

With respect to FIG. 2A, the user may select the seats using his or her finger 216, a stylus, a mouse, a remote, a keyboard, a touch screen, a combination thereof, etc. to select the desired seats. Once the seats are selected, the user may enter a purchase screen whereby the user can purchase the tickets using a credit card, selecting a cash option, linking to a payment vendor (e.g., APPLEPAY, VENMO, etc.), using an already linked payment option, etc. In some embodiments, the ticket or reservation may allow for hands-free access to the location, such that the location of the client device 104, another device associated with the user, facial recognition, another recognition technology, and/or some other method may be used to allow access with minimal person to person or person to object contact.

Figure 2B:
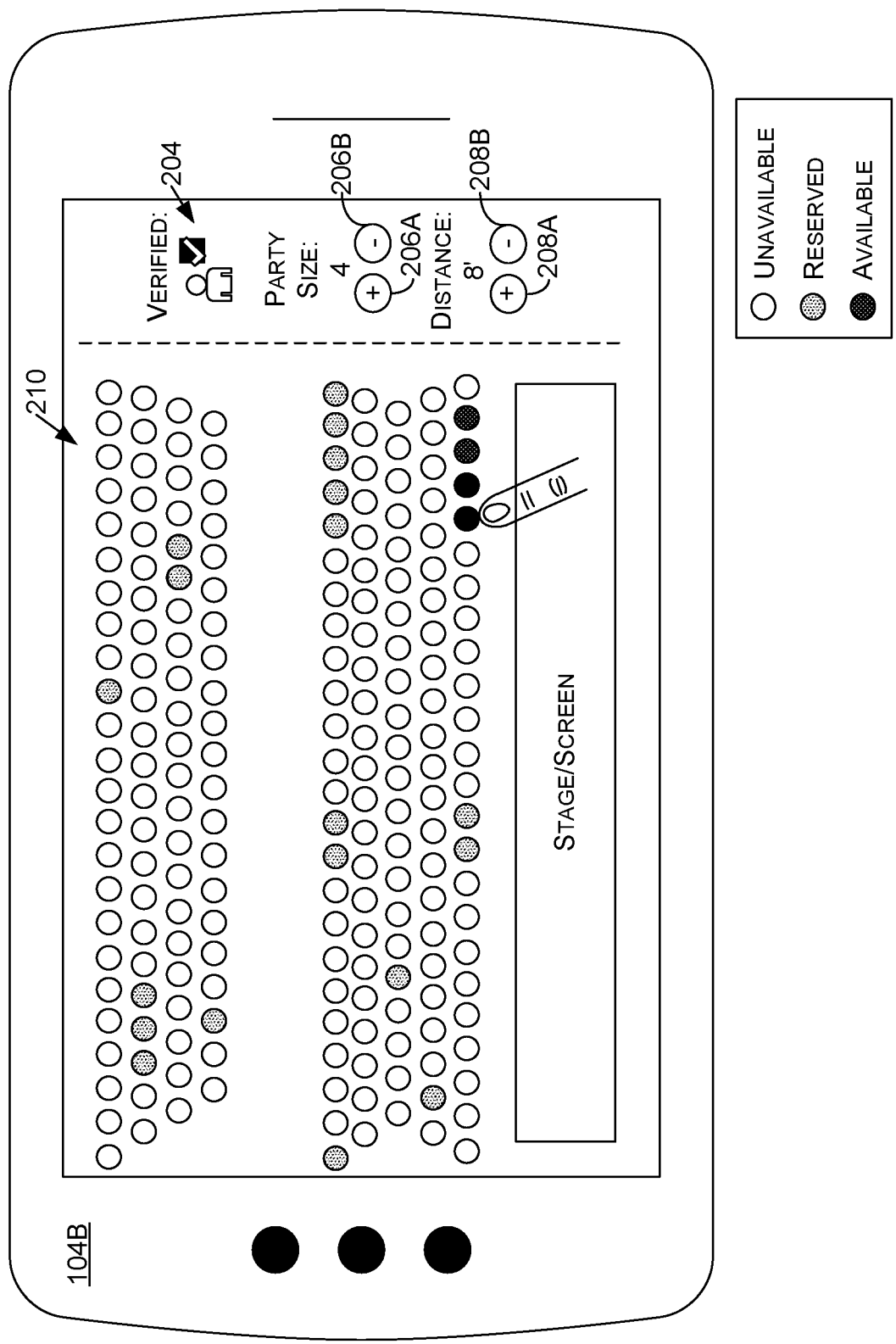

Once the seats have been selected and/or purchased, this information may be used by the system 100—e.g., transmitted from the client device 104 to the server device(s) 102—to update the seating diagram 210 for a next user. As such, when a next user, as indicated by FIG. 2B, attempts to find available seats, the seats that were selected by the prior user may be shown as reserved or otherwise unavailable, and may also be used by the system 100 to factor in the minimum distance measure to determine available seats for the new user.

Figure 3:
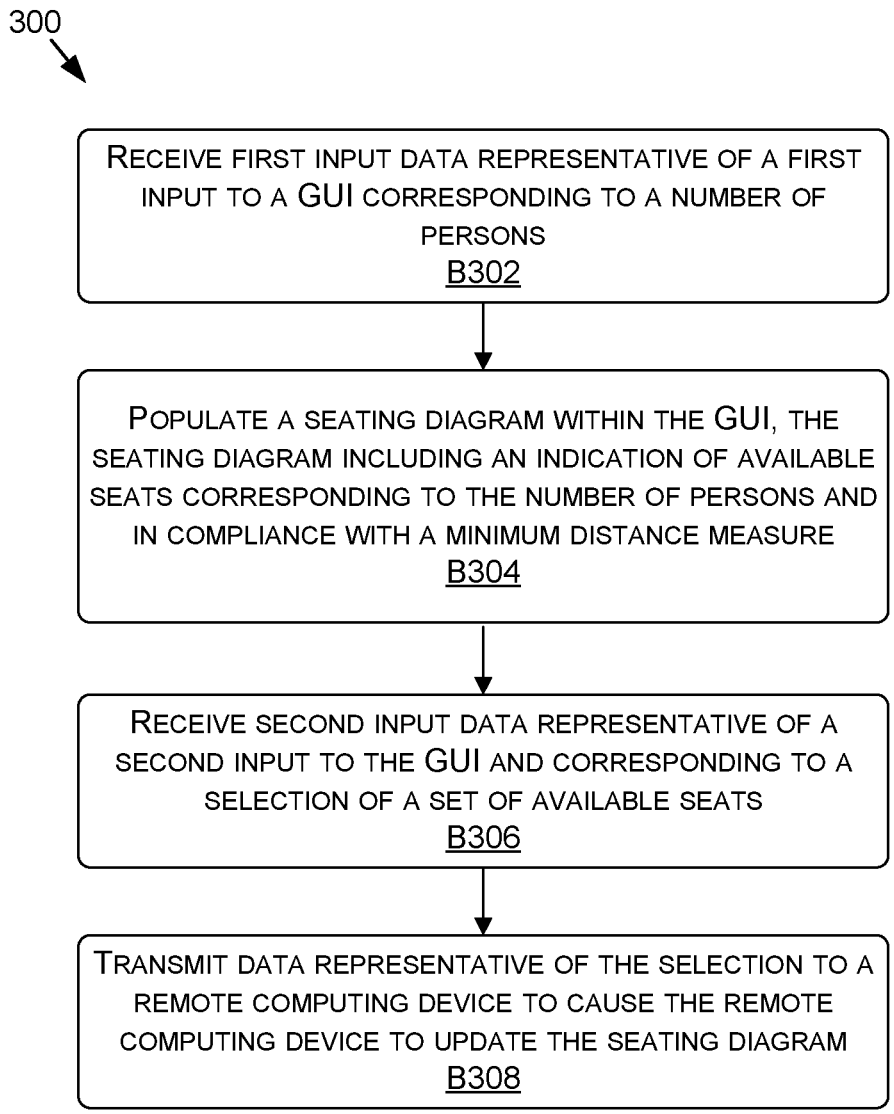
FIG. 3 is a flow diagram illustrating a method for seat selection in compliance with minimum distance measures, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the system 100 of FIG. 1. However, this method may additionally or alternatively be executed by any one system, or any combination of systems, including, but not limited to, those described herein.

FIG. 3 is a flow diagram illustrating a method 300 for seat selection in compliance with minimum distance measures, in accordance with some embodiments of the present disclosure. The method 300, at block B302, includes receiving first user input data representative of a first input to a GUI corresponding to a number of persons. For example, a user may select, within a GUI of the client application 110, a number of users or persons for which a seat is desired.

The method 300, at block B304, includes populating a seating diagram within the GUI, the seating diagram including an indication of available seats corresponding to the number of persons and in compliance with a minimum distance measure. For example, the seating diagram 210 may be populated or updated and displayed within the GUI to indicate available seats that are determined based on the number of person and the minimum distance measure being satisfied.

The method 300, at block B306, includes receiving second input data representative of a second input to the GUI and corresponding to a selection of a set of available seats. For example, the user may select the seat(s) that are available to the user from the updated or populated seating diagram 210.

The method 300, at block B308, includes transmitting data representative of the selection to a remote computing device to cause the remote computing device to update the seating diagram. For example, once selected, the data representing which seats were selected, reserved, and/or purchases may be transmitted from the client device 104 to the server(s) 102, and the server may update the seating diagram 210 for each other or next user of the system.

Example Computing Device

Figure 4:
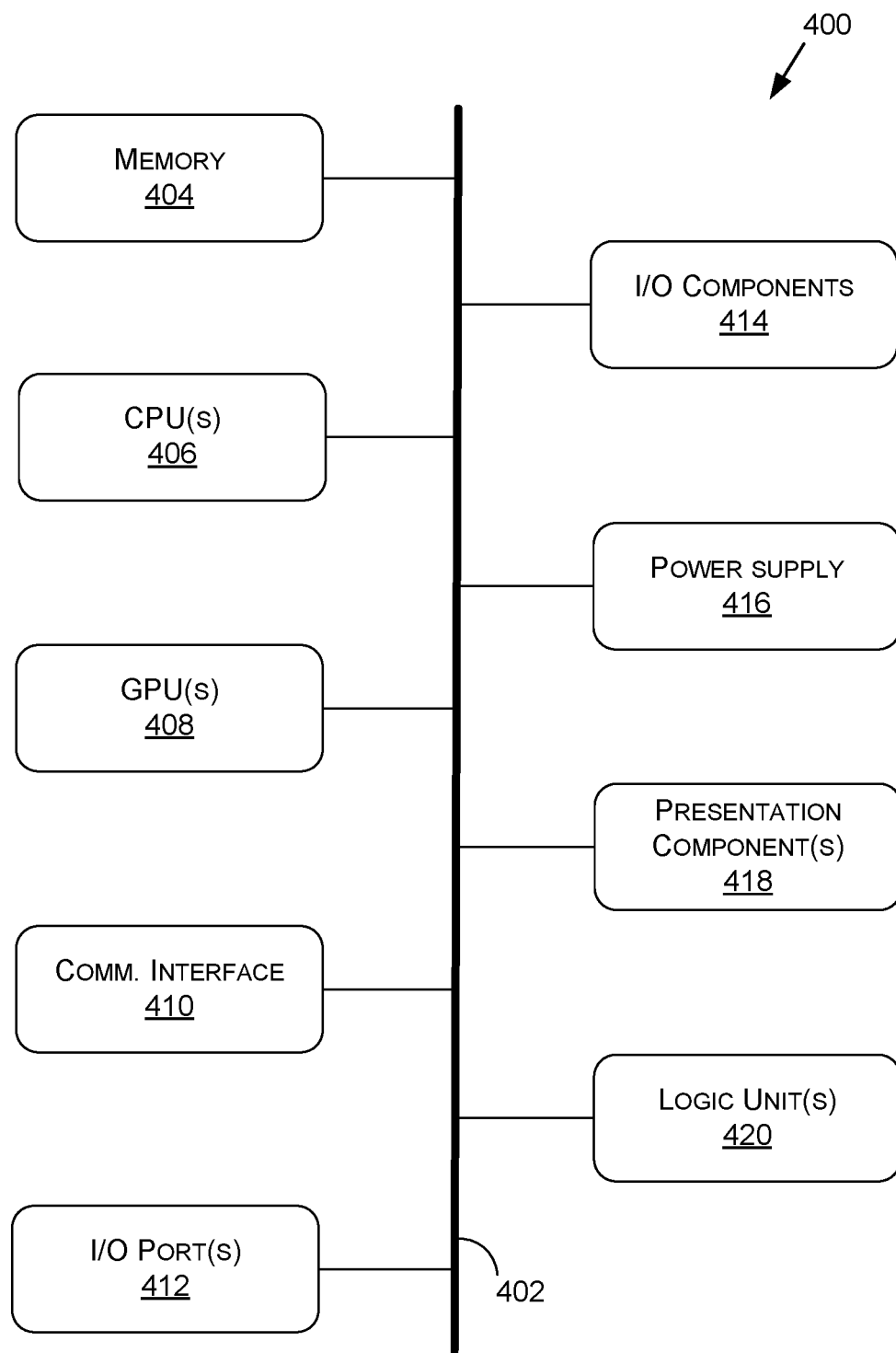
FIG. 4 is a block diagram of an example computing device suitable for use in implementing some embodiments of the present disclosure.

FIG. 4 is a block diagram of an example computing device(s) 400 suitable for use in implementing some embodiments of the present disclosure. Computing device 400 may include an interconnect system 402 that directly or indirectly couples the following devices: memory 404, one or more central processing units (CPUs) 406, one or more graphics processing units (GPUs) 408, a communication interface 410, input/output (I/O) ports 412, input/output components 414, a power supply 416, one or more presentation components 418 (e.g., display(s)), and one or more logic units 420.

Although the various blocks of FIG. 4 are shown as connected via the interconnect system 402 with lines, this is not intended to be limiting and is for clarity only. For example, in some embodiments, a presentation component 418, such as a display device, may be considered an I/O component 414 (e.g., if the display is a touch screen). As another example, the CPUs 406 and/or GPUs 408 may include memory (e.g., the memory 404 may be representative of a storage device in addition to the memory of the GPUs 408, the CPUs 406, and/or other components). In other words, the computing device of FIG. 4 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 4.

The interconnect system 402 may represent one or more links or busses, such as an address bus, a data bus, a control bus, or a combination thereof. The interconnect system 402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 406 may be directly connected to the memory 404. Further, the CPU 406 may be directly connected to the GPU 408. Where there is direct, or point-to-point connection between components, the interconnect system 402 may include a PCIe link to carry out the connection. In these examples, a PCI bus need not be included in the computing device 400.

The memory 404 may include any of a variety of computer-readable media. The computer-readable media may be any available media that may be accessed by the computing device 400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 406 may be configured to execute at least some of the computer-readable instructions to control one or more components of the computing device 400 to perform one or more of the methods and/or processes described herein. The CPU(s) 406 may each include one or more cores (e.g., one, two, four, eight, twenty-eight, seventy-two, etc.) that are capable of handling a multitude of software threads simultaneously. The CPU(s) 406 may include any type of processor, and may include different types of processors depending on the type of computing device 400 implemented (e.g., processors with fewer cores for mobile devices and processors with more cores for servers). For example, depending on the type of computing device 400, the processor may be an Advanced RISC Machines (ARM) processor implemented using Reduced Instruction Set Computing (RISC) or an x86 processor implemented using Complex Instruction Set Computing (CISC). The computing device 400 may include one or more CPUs 406 in addition to one or more microprocessors or supplementary co-processors, such as math co-processors.

In addition to or alternatively from the CPU(s) 406, the GPU(s) 408 may be configured to execute at least some of the computer-readable instructions to control one or more components of the computing device 400 to perform one or more of the methods and/or processes described herein. One or more of the GPU(s) 408 may be an integrated GPU (e.g., with one or more of the CPU(s) 406 and/or one or more of the GPU(s) 408 may be a discrete GPU. In embodiments, one or more of the GPU(s) 408 may be a coprocessor of one or more of the CPU(s) 406. The GPU(s) 408 may be used by the computing device 400 to render graphics (e.g., 3D graphics) or perform general purpose computations. For example, the GPU(s) 408 may be used for General-Purpose computing on GPUs (GPGPU). The GPU(s) 408 may include hundreds or thousands of cores that are capable of handling hundreds or thousands of software threads simultaneously. The GPU(s) 408 may generate pixel data for output images in response to rendering commands (e.g., rendering commands from the CPU(s) 406 received via a host interface). The GPU(s) 408 may include graphics memory, such as display memory, for storing pixel data or any other suitable data, such as GPGPU data. The display memory may be included as part of the memory 404. The GPU(s) 408 may include two or more GPUs operating in parallel (e.g., via a link). The link may directly connect the GPUs or may connect the GPUs through a switch. When combined together, each GPU 408 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 406 and/or the GPU(s) 408, the logic unit(s) 420 may be configured to execute at least some of the computer-readable instructions to control one or more components of the computing device 400 to perform one or more of the methods and/or processes described herein. In embodiments, the CPU(s) 406, the GPU(s) 408, and/or the logic unit(s) 420 may discretely or jointly perform any combination of the methods, processes and/or portions thereof. One or more of the logic units 420 may be part of and/or integrated in one or more of the CPU(s) 406 and/or the GPU(s) 408 and/or one or more of the logic units 420 may be discrete components or otherwise external to the CPU(s) 406 and/or the GPU(s) 408. In embodiments, one or more of the logic units 420 may be a coprocessor of one or more of the CPU(s) 406 and/or one or more of the GPU(s) 408.

Examples of the logic unit(s) 420 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 410 may include one or more receivers, transmitters, and/or transceivers that enable the computing device 400 to communicate with other computing devices via an electronic communication network, included wired and/or wireless communications. The communication interface 410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 412 may enable the computing device 400 to be logically coupled to other devices including the I/O components 414, the presentation component(s) 418, and/or other components, some of which may be built in to (e.g., integrated in) the computing device 400. Illustrative I/O components 414 include a microphone, mouse, keyboard, joystick, game pad, game controller, satellite dish, scanner, printer, wireless device, etc. The I/O components 414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 400. The computing device 400 may be include depth cameras, such as stereoscopic camera systems, infrared camera systems, RGB camera systems, touchscreen technology, and combinations of these, for gesture detection and recognition. Additionally, the computing device 400 may include accelerometers or gyroscopes (e.g., as part of an inertia measurement unit (IMU)) that enable detection of motion. In some examples, the output of the accelerometers or gyroscopes may be used by the computing device 400 to render immersive augmented reality or virtual reality.

The power supply 416 may include a hard-wired power supply, a battery power supply, or a combination thereof. The power supply 416 may provide power to the computing device 400 to enable the components of the computing device 400 to operate.

The presentation component(s) 418 may include a display (e.g., a monitor, a touch screen, a television screen, a heads-up-display (HUD), other display types, or a combination thereof), speakers, and/or other presentation components. The presentation component(s) 418 may receive data from other components (e.g., the GPU(s) 408, the CPU(s) 406, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   receiving, using an application, first input data representative of a first input to a graphical user interface (GUI) corresponding to a number of persons;
   determining, based at least in part on the number of persons and a seating diagram associated with a venue, one or more final sets of available spaces from within one or more potential sets of available spaces, wherein the determining is based at least in part on computing a number of unavailable spaces that result if one or more selections of the one or more potential sets of available spaces is received, the one or more final sets of available spaces corresponding to a lower number of unavailable spaces than at least one of the one or more potential sets not included in the one or more final sets of available spaces, wherein the computing the number of unavailable spaces is based at least in part on maintaining a distance between one or more previously reserved spaces and at least one of the one or more potential sets of available spaces to comply with a distance measure;
   causing display, based at least in part on the one or more final sets of available spaces, of a visualization of the seating diagram within the GUI, the visualization of the seating diagram including a first indication of the one or more final sets of available spaces, a second indication of the one or more previously reserved spaces, and a third indication of one or more of the unavailable spaces;
   receiving, using the application, second input data representative of a second input to the GUI corresponding to a selection of a set of available spaces from the one or more final sets of available spaces; and
   transmitting data representative of the selection to a remote computing device.

2. The method of claim 1, wherein the distance measure is determined based at least in part on social distancing measures.

3. The method of claim 1, wherein the selection is a first selection, and the method further comprises:
   receiving, using the application, third input data representative of a third input to the GUI corresponding to a second selection of one or more of food, a drink, or an item available at the venue.

4. The method of claim 1, wherein the distance is determined based at least in part on actual distances between spaces at the venue, the actual distance determined based at least in part on at least one of a size of each space, a dimension of each space, or spacing between spaces.

5. The method of claim 1, wherein the selection is a first selection, the data is first data, and the method further comprises:
   receiving, using the application, third input data representative of a third input to the GUI corresponding to a second selection of an event;
   transmitting second data associated with the second selection to the remote computing device; and
   receiving, from the remote computing device and based at least in part on the second selection, third data representative of the seating diagram.

6. The method of claim 1, wherein the selection is a first selection, the data is first data, the determining the one or more final sets of available spaces is executed using the remote computing device, and the method further comprises:
   receiving, using the application, third input data representative of a third input to the GUI corresponding to a second selection of an event;
   transmitting second data corresponding to the second selection and the number of persons to the remote computing device; and
   receiving, from the remote computing device and based at least in part on the second selection, the number of persons, and the determining the one or more final sets of available spaces, third data representative of the visualization of the seating diagram.

7. The method of claim 1, further comprising causing display, using the application and within the GUI, of a payment feature for purchasing the set of available spaces.

8. The method of claim 1, wherein the seating diagram corresponds to one of an airplane, a movie theater, a musical theater, a concert venue, a sporting venue, a restaurant, a bar, a wedding venue, a casino, an amusement park, or a convention space.

9. The method of claim 1, wherein the number of persons includes one or more persons and the one or more final sets of available spaces each include one or more spaces.

10. A method comprising:
receiving, from one or more remote client devices, first data representative of at least one of selections or purchases of spaces at a location;
receiving, from a remote client device, second data representative of a first input to a graphical user interface (GUI) of an application executing on the remote client device, the first input corresponding to a first selection of a number of persons;
determining, based at least in part on the number of persons and a seating diagram associated with the location, one or more final sets of available spaces from within one or more potential sets of available spaces, wherein the determining is based at least in part on computing a number of unavailable spaces that result if one or more selections of the one or more potential sets of available spaces is received, the one or more final sets of available spaces corresponding to a lower number of unavailable spaces than at least one of the one or more potential sets not included in the one or more final sets of available spaces, wherein the computing the number of unavailable spaces is based at least in part on maintaining a distance between one or more previously reserved spaces and at least one of the one or more potential sets of available spaces to comply with a distance measure;
generating, based at least in part on the number of persons and the determining the one or more final sets of available spaces, a visualization of the seating diagram to include a first indication of the one or more final sets of available spaces and a second indication of one or more of the unavailable spaces; and
transmitting, to the remote client device, third data representative of the visualization of the seating diagram.

11. The method of claim 10, wherein the method is executed by one or more computing devices in a cloud computing environment.

12. The method of claim 10, further comprising:
receiving, from the remote client device, fourth data associated with a second input to the GUI of the application, the second input corresponding to a second selection of a set of available spaces from the one or more final sets of available spaces; and
verifying purchase of the set of available spaces.

13. The method of claim 10, wherein the location includes one of an airplane, a movie theater, a musical theater, a concert venue, a sporting venue, a restaurant, a bar, a wedding venue, or a convention space.

14. The method of claim 10, further comprising:
receiving, from the remote client device, fourth data associated with a second input to the GUI of the application, the second input corresponding to a second selection of at least one of food, a drink, or an item.

15. The method of claim 10, wherein the selections or the purchases of spaces are based at least in part on the distance measure.

16. The method of claim 10, wherein the distance is based at least in part on actual distances between spaces at the location, the actual distance determined based at least in part on at least one of a size of each space, a dimension of each space, or spacing between spaces.

17. The method of claim 10, wherein the determining the one or more final sets of available spaces is further based at least in part on a capacity for the location.

18. The method of claim 10, further comprising:
dynamically adjusting space assignments to increase occupancy at the location while remaining below a capacity for the location.

19. A system comprising:
one or more processors;
one or more memory devices storing instructions that, when executed by the one or more processors, cause the one or more processors to execute operations comprising:
receiving, using an application, first input data representative of a first input to a graphical user interface (GUI) corresponding to a number of persons;
determining, based at least in part on the number of persons and a seating diagram associated with a venue, one or more final sets of available spaces from within one or more potential sets of available spaces, wherein the determining is based at least in part on computing a number of unavailable spaces that result if one or more selections of the one or more potential sets of available spaces is received, the one or more final sets of available spaces corresponding to a lower number of unavailable spaces than at least one of the one or more potential sets not included in the one or more final sets of available spaces, wherein the computing the number of unavailable spaces is based at least in part on maintaining a distance between one or more previously reserved spaces and at least one of the one or more potential sets of available spaces to comply with a distance measure;
causing display, based at least in part on the one or more final sets of available spaces, of a visualization of the seating diagram within the GUI, the visualization of the seating diagram including a first indication of the one or more final sets of available spaces, a second indication of the one or more previously reserved spaces, and a third indication of one or more of the unavailable spaces;
receiving, using the application, second input data representative of a second input to the GUI corresponding to a selection of a set of available spaces from the one or more final sets of available spaces; and
transmitting data representative of the selection to a remote computing device.

20. The system of claim 19, wherein the system includes one or more of a client device and a cloud computing device remotely located with respect to the client device.

* * * * *